United States Patent
Cociglio et al.

(10) Patent No.: US 12,107,745 B2
(45) Date of Patent: *Oct. 1, 2024

(54) ENABLING A ROUND-TRIP PACKET LOSS MEASUREMENT IN A PACKET-SWITCHED COMMUNICATION NETWORK

(71) Applicants: TELECOM ITALIA S.p.A., Milan (IT); POLITECNICO DI TORINO, Turin (IT)

(72) Inventors: Mauro Cociglio, Turin (IT); Fabio Bulgarella, Palermo (IT)

(73) Assignees: TELECOM ITALIA S.p.A., Milan (IT); POLITECNICO DI TORINO, Turin (IT)

( * ) Notice: Subject to any disclaimer, the term of this patent is extended or adjusted under 35 U.S.C. 154(b) by 449 days.

This patent is subject to a terminal disclaimer.

(21) Appl. No.: 17/425,530

(22) PCT Filed: Jan. 27, 2020

(86) PCT No.: PCT/EP2020/051911
§ 371 (c)(1),
(2) Date: Jul. 23, 2021

(87) PCT Pub. No.: WO2020/156996
PCT Pub. Date: Aug. 6, 2020

(65) Prior Publication Data
US 2022/0191117 A1 Jun. 16, 2022

(30) Foreign Application Priority Data
Jan. 29, 2019 (IT) .................. 102019000001289

(51) Int. Cl.
*H04L 43/0829* (2022.01)
(52) U.S. Cl.
CPC .................. *H04L 43/0841* (2013.01)

(58) Field of Classification Search
None
See application file for complete search history.

(56) References Cited

U.S. PATENT DOCUMENTS

| 2007/0097865 A1 | 5/2007 | Song et al. |
| 2008/0069005 A1* | 3/2008 | von Eicken ............ H04L 41/22 370/252 |

(Continued)

FOREIGN PATENT DOCUMENTS

| CN | 1423869 A | 6/2003 |
| CN | 103636169 A | 3/2014 |

(Continued)

OTHER PUBLICATIONS

International Search Report issued Apr. 15, 2020 in PCT/EP2020/051911 filed Jan. 27, 2020.

(Continued)

*Primary Examiner* — Diane L Lo
(74) *Attorney, Agent, or Firm* — Oblon, McClelland, Maier & Neustadt, L.L.P.

(57) ABSTRACT

A method for enabling a round-trip packet loss measurement between two nodes of a packet-switched communication network exchanging packets comprising a packet loss field settable to an idle value or one or more measurement values. The first node transmits to the second node first packets having the packet loss field set to a measurement value. Upon reception of each first packet, the second node transmits back to the first node a respective second packet having the packet loss field set to a measurement value. Upon reception of each second packet, the first node transmits back to the second node a respective third packet having the packet loss field set to a measurement value. A measurement point placed between the two nodes may count the number (Continued)

of first packets and the number of third packets and use them to provide a round-trip packet loss measurement.

15 Claims, 6 Drawing Sheets

(56) References Cited

U.S. PATENT DOCUMENTS

| | | | |
|---|---|---|---|
| 2010/0008250 A1* | 1/2010 | Nomura | H04L 43/0852 370/252 |
| 2011/0199929 A1* | 8/2011 | Guo | H04L 43/0852 370/252 |
| 2012/0120813 A1 | 5/2012 | Johansson et al. | |
| 2014/0146686 A1* | 5/2014 | Sakurai | H04L 43/0829 370/241.1 |
| 2015/0023179 A1 | 1/2015 | Stein et al. | |
| 2015/0195159 A1 | 7/2015 | Kim et al. | |
| 2016/0344600 A1 | 11/2016 | Stein et al. | |
| 2022/0263742 A1* | 8/2022 | Cociglio | H04L 43/0864 |
| 2023/0009799 A1* | 1/2023 | Cociglio | H04L 43/0841 |

FOREIGN PATENT DOCUMENTS

| | | |
|---|---|---|
| CN | 104837008 A | 8/2015 |
| CN | 109196823 A | 1/2019 |
| EP | 2 731 301 A1 | 5/2014 |
| WO | WO 2010/045844 A1 | 4/2010 |
| WO | WO 2010/072251 A1 | 7/2010 |
| WO | WO 2017032133 A1 | 3/2017 |

OTHER PUBLICATIONS

Trammel, B., et al., Internet draft "The addition of a Spin Bit to the QUIC Transport Protocol draft-trammel-quic-spin-01", QUIC, 2017, 22 total pages.

Combined Chinese Office Action and Search Report issued Aug. 28, 2023 in Patent Application No. 202080011181.1 (with English language translation), 23 pages.

Deng Xiao-heng, et al., "MP-Start: bandwidth measurement based and phase-divided TCP slow start mechanism," Journal on Communications, vol. 28, No. 11, Nov. 2007, pp. 92-102.

Chinese Office Action dated Apr. 23, 2024, issued in Chinese Patent Application No. 202080011181.1 (with English translation).

Cao Zhen, Ren Hailan. "Research on TCP performances of optical packet switching networks." (SKL of OCTN, Wuhan Research Institute of Post and Telecommunications, Wuhan 430074 China). Jun. 10, 2010.

Wenhao Wu, Zhi Ding. "On Efficient Packet-Switched Wireless Networking: A Markovian Approach to Trans-layer Design and Optimization of ROHC." Jul. 31, 2017.

* cited by examiner

# ENABLING A ROUND-TRIP PACKET LOSS MEASUREMENT IN A PACKET-SWITCHED COMMUNICATION NETWORK

TECHNICAL FIELD

The present invention relates to the field of communication networks. In particular, the present invention relates to a method for enabling a round-trip packet loss measurement in a packet-switched communication network, and to a packet-switched network configured to implement such method.

BACKGROUND ART

In a packet-switched communication network, packet flows are transmitted from source nodes to destination nodes through possible intermediate nodes. Exemplary packet-switched networks are IP (Internet Protocol) networks, Ethernet networks and MPLS (Multi-Protocol Label Switching) networks.

Packets not always reach their destination nodes, i.e. they may be lost during transmission through the network. Packet loss is due to different reasons. For instance, a node or link may fail, or packets may be discarded by a node due to a congestion of its ports. Also, packets may be discarded by a node since they contain bit errors.

When a communication service (in particular, a real-time voice or data service such as call, conference call, video conference, etc.) is provided by means of a packet-switched network, a performance measurement in terms of packet loss, one-way delay and/or jitter on packet flows carrying the service provides an indication of the quality of service (QoS) perceived by the end users of the service. In addition, packet loss and high delay/jitter may require retransmission and then reduce the efficiency of the communication network. Therefore, measuring packet loss of packet flows in a communication network is of particular interest for network operators.

WO 2010/072251, in the name of the same Applicant, discloses a method for measuring packet loss on a packet flow which uses an alternate marking technique, whereby the packet flow to be measured is divided into blocks of packets comprising a first marking value (e.g. a dedicated marking bit in their header set to "1") and blocks of packets comprising a second marking value (e.g. e.g. a dedicated marking bit in their header set to "0"). The marking value is periodically switched, so that the blocks of packets with the first marking value are interleaved with the blocks of packets with the second marking value. Two measurement points are provided on the path of the marked packets.

Each measurement point implements a couple of counters counting the number of packets with the first and second marking values, respectively. The packet loss between the two measurement points is calculated using the counter values.

As known, QUIC (Quick UDP Internet Connections) is a transport layer (layer 4) network protocol designed to support multiplexed connections between two endpoints over User Datagram Protocol (UDP). In order to manage reception sequence errors, the QUIC header comprises a packet number field, wherein a packet number is written in each packet upon its transmission.

B. Trammel et al.: Internet draft "The addition of a Spin Bit to the QUIC Transport Protocol draft-trammel-quic-spin-01", Dec. 13, 2017 describes the addition of a so-called "latency spin bit" (or, briefly, "spin bit") in the QUIC header, which allows RTT (round-trip time) measurements on two counter-propagating packet flows exchanged between two nodes. According to the Internet draft, both the nodes (also termed "client" and "server") initially transmit the respective packets with the value of their spin bits set to 0. The client starts an RTT measurement by setting the value of its spin bit to 1. This change of spin bit value may be seen as an edge in the spin bit signal transmitted from client to server. As the server receives such edge, it changes the value of its own spin bit from 0 to 1. This way, the server substantially reflects the edge of the spin bit signal back to the client. As the client receives the reflected edge of the spin bit signal from the server, it switches the value of its spin bit back to 0. This may be seen as another edge in the spin bit signal transmitted from client to server, which is received at the server and reflected back to the client as described above. A rough RTT may then be measured at any intermediate measurement point placed between client and server, as the duration of a spin bit period, namely of the time lapsing between passage in a same direction (e.g. from client to server) of two consecutive edges of the spin bit signal.

SUMMARY OF THE INVENTION

The Applicant has perceived the need to provide a method for enabling a packet loss measurement in a packet-switched communication network which—while the spin bit technique described above allows to measure a rough RTT—allows any intermediate measurement point placed between two nodes (e.g. client and server, according to the QUIC terminology) to measure a rough "round-trip packet loss" between the two nodes, where the expression "round-trip packet loss" indicates a measurement of the number of packets lost in two counter-propagating flows exchange between the two nodes.

The Applicant has noticed that such round-trip packet loss can not be measured as a sum of the one-way packet losses affecting the two counter-propagating flows and measured for example according to the above mentioned WO 2010/072251.

First of all, indeed, the measurement of each one-way packet loss would require two measurement points.

Moreover, the Applicant has noticed that a mere sum of the one-way packet losses would not take into account the fact that, typically, the two counter-propagating directions of a link (e.g. upstream and downstream) exhibit very different packet rates, e.g. 1:10. Hence, during a marking period, the one-way packet loss may be measured on different numbers of packets in the two directions and, therefore, a same number of lost packets may have very different weights in the two directions.

For example, if 1 packet of 100 transmitted packets is lost in one direction (e.g. downstream) during a certain marking period and 1 packet of 10 transmitted packets is lost in the other direction (e.g. upstream) during the same marking period, a mere sum of the one-way packet losses would be 2 which, averaged on the overall number of transmitted packets 100+10, would provide a round-trip packet loss rate of 2/110.

As another example, if 2 packets are lost of 100 transmitted packets in the downstream direction and no packet is lost of 10 transmitted packets in the upstream direction, the mere sum of the one-way packet losses would be again 2. The round-trip packet loss rate would then be again 2/110, irrespective of the fact that—differently from the previous case—the lost packets are now all concentrated in the downstream direction having the higher packet rate, and then the loss weight is reduced.

In view of the above, the Applicant has tackled the problem of providing a method for enabling a packet loss measurement in a packet-switched communication network, which allows any intermediate measurement point placed between two nodes to measure a round-trip packet loss taking into account the fact that the packet rates in the two directions may be different.

In the following description and in the claims, the expression "enabling a performance measurement in a packet-switched communication network" will designate an operation of marking and/or conditioning packets exchanged between two nodes of the packet-switched communication network in such a way that a packet loss measurement can be made, possibly at intermediate nodes.

The Applicant has realized that, in order to provide an accurate measurement of the round-trip packet loss which takes in due account the different packet rates in the two counter-propagating directions, the measurement shall be performed on the same number of packets in both directions.

For example, if 1 packet of 100 transmitted packets is lost in one direction (e.g. downstream) during a certain marking period and 1 packet of 10 transmitted packets is lost in the other direction (e.g. upstream) during the same marking period, the measurement in the downstream direction will be performed on 10 packets only amongst the 100 transmitted ones. If the considered packets include the lost one (less probable case) the downstream packet loss is again 1, which provides a round-trip packet loss rate of 2/20. Otherwise (more probable case) the downstream packet loss is 0, which provides a round-trip packet loss rate of 1/20. By repeating such downstream measurement several times, an average downstream packet loss of 0.1 would be found, which would provide an average round-trip packet loss rate of 1.1/20.

If instead 2 packets are lost of 100 transmitted packets in the downstream direction and no packet is lost of 10 transmitted packets in the upstream direction, performing the measurement in the downstream direction on 10 packets only amongst the 100 transmitted ones provides, in case the considered packets include the lost ones (less probable case) the downstream packet loss is again 2, a round-trip packet loss rate of 2/20. Otherwise (more probable case) the downstream packet loss is 0, which provides a round-trip packet loss rate of 0. By repeating such downstream measurement several times, an average downstream packet loss of 0.2 would be found, which would provide an average round-trip packet loss rate of 0.2/20. It may be appreciated that this value is lower that the one obtained in the previous case (1.1/20), because it takes into account the fact that the lost packets are now all concentrated in the direction (downstream) having the higher packet rate, so that their weight is lower than in the previous case where the lost packets were equally distributed between both directions.

Such numeric examples clearly show that, if the one-way packet losses are measured on a same number of transmitted packets, the different packet rates in the two directions are duly taken into account, so that the number of lost packets in each direction has a 50% weight in the final value of the round-trip packet loss rate.

According to embodiments of the present invention, the above problem is then solved by a method wherein a first node and a second node of a communication network exchange packets comprising a packet loss field settable to either an idle value or to at least one measurement value. The first node transmits to the second node first packets having their packet loss fields set to the at least one measurement value. Upon reception from the first node of each one of the first packets, the second node transmits to the first node a respective second packet comprising the at least one measurement value. Upon reception from the second node of each one of the second packets, the first node transmits to the second node a respective third packet comprising the at least one measurement value.

A measurement point may then count the number of first packets and the number of third packets transmitted from the first node to the second node, based on which a round-trip packet loss measurement can then be performed. It shall be noticed that the measurement point may be implemented and operated by an entity other than the entity managing the setting of the packet loss field of the packets at the first and second nodes of the communication network.

Hence, advantageously, since the first and third packets upon which the measurement is carried out are transmitted in a same direction (namely, from the first node to the second node), the round-trip packet loss may be measured by a single measurement point located between the first and second node and configured to detect packets in that direction.

Further, since the third packets are obtained by a double reflection—at the second node and then at the first node—of the first packets, the measurement of the round-trip packet loss is advantageously performed on a same number of packets (short of lost packets) transmitted in both directions between the first and second node, independently of the packet rates in the two directions. Hence, as discussed above, the measurements are accurate even when the two directions exhibit different packet rates.

According to a first aspect, the present invention provides a method for enabling a round-trip packet loss measurement in a packet-switched communication network, the method comprising exchanging between a first node and a second node of the communication network packets comprising a packet loss field, wherein the packet loss field is settable to either an idle value or at least one measurement value, the exchanging comprising:

a) by the first node transmitting to the second node first packets having the packet loss field set to the at least one measurement value;

b) by the second node, upon reception from the first node of each one of the first packets, transmitting to the first node a respective second packet having the packet loss field set to the at least one measurement value; and c) by the first node, upon reception from the second node of each one of the second packets, transmitting to the second node a respective third packet having the packet loss field set to the at least one measurement value.

Preferably, step a) comprises setting the packet loss field of a packet to be transmitted to the second node equal to the at least one measurement value upon reception of a packet from the second node.

Preferably, step a) is terminated when the first node receives the first one of the second packets from the second node.

According to a first embodiment, the packet loss field is settable to either the idle value or a measurement value.

According to the first embodiment, the first node executes at least one of:

a first pause at the end of the step a) before starting step c); and a second pause at the end of the step c) before repeating step a), the first pause and the second pause comprising forcing to the idle value the packet loss field of each packet to be transmitted to the second node.

According to a first variant of the first embodiment, at least one of step a) and step c) comprises ignoring packets received at the first node from the second node after a time gap has lapsed since the beginning of step a) and step c), respectively.

According to a second variant of the first embodiment, the first node executes at least one of:
- a further pause since reception of the last one of the second packets from the second node, before starting step c); and
- a still further pause since reception of the last one of fourth packets having the packet loss field set to the measurement value and transmitted by the second node upon reception of the third packets, before repeating step a), the further pause and the still further pause comprising forcing to the idle value the packet loss field of each packet to be transmitted to the second node.

According to a second embodiment, the packet loss field is settable to either the idle value or any of at least two different and ordered measurement values.

According to the second embodiment:
- step a) comprises setting the packet loss field of a packet to be transmitted to the second node equal to a measurement value MV(k) when a packet is received from the second node whose packet loss field is equal to either the idle value or to a preceding measurement value MV(k−1);
- step b) comprises, upon reception from the first node of each one of the first packets having the packet loss field equal to the measurement value MV(k), transmitting to the first node a respective second packet having the packet loss field set to the measurement value MV(k); and
- step c) comprises, upon reception from the second node of each one of the second packets having the packet loss field equal to the measurement value MV(k), transmitting to the second node a respective third packet having the packet loss field set to a subsequent measurement value MV(k+1).

According to a second aspect, the present invention provides a method for performing a round-trip packet loss measurement in a packet-switched communication network, the method comprising the steps of the method as set forth above and:
- d) at a measurement point, counting a number of the first packets and counting a number of the third packets, the round-trip packet loss measurement being based on the number of the first packets and the number of the third packets.

Optionally, the method further comprises providing a round-trip time measurement between the first node and the second node as a difference between detection times T1 and T2 of the first detected one of the first packets and the last detected one of the first packets.

According to a third aspect, the present invention provides a method for exchanging packets between a first node and a second node of a packet-switched communication network, the packets comprising a packet loss field settable to either an idle value or at least one measurement value, the method comprising:
- a) by the first node transmitting to the second node first packets having the packet loss field set to the at least one measurement value;
- b) by the second node, upon reception from the first node of each one of the first packets, transmitting to the first node a respective second packet having the packet loss field set to the at least one measurement value; and
- c) by the first node, upon reception from the second node of each one of the second packets, transmitting to the second node a respective third packet having the packet loss field set to the at least one measurement value.

According to a fourth aspect, the present invention provides a packet-switched communication network comprising a first node and a second node configured to exchange packets comprising a packet loss field, wherein the packet loss field is settable to either an idle value or at least one measurement value, wherein:
- the first node is configured to transmit to the second node first packets having the packet loss field set to the at least one measurement value;
- the second node is configured to, upon reception from the first node of each one of the first packets, transmit to the first node a respective second packet having the packet loss field set to the at least one measurement value; and
- the first node is further configured to, upon reception from the second node of each one of the second packets, transmit to the second node a respective third packet having the packet loss field set to the at least one measurement value.

Preferably, the packet-switched communication network further comprising at least one measurement point configured to count a number of the first packets and count a number of the third packets, a round-trip packet loss measurement being based on the number of the first packets and the number of the third packets.

BRIEF DESCRIPTION OF THE DRAWINGS

The present invention will become clearer from the following detailed description, given by way of example and not of limitation, to be read with reference to the accompanying drawings, wherein.

DETAILED DESCRIPTION OF PREFERRED EMBODIMENTS OF THE INVENTION

Figure 1:
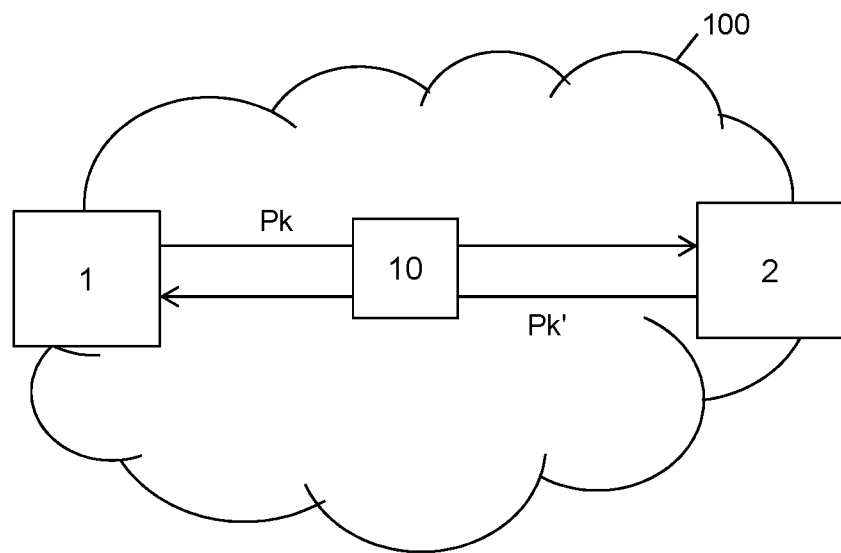
FIG. 1 schematically shows a packet-switched communication network in which the method for enabling a round-trip packet loss measurements according to embodiments of the present invention is implemented.

FIG. 1 schematically shows a packet-switched communication network 100 configured to enable round-trip packet loss measurements according to an embodiment of the present invention.

The communication network 100 comprises a plurality of nodes reciprocally interconnected by physical links according to any known topology, including two nodes 1 and 2 shown in FIG. 1. The nodes 1 and 2 may be connected by a single physical link or by the concatenation of several physical links and intermediate nodes (not shown in the drawings). The communication network 100 may be for instance an IP network.

The node 1 is configured to transmit packets Pk to the node 2, while the node 2 is configured to transmit packets Pk' to the node 1, as schematically depicted in FIG. 1. The packets Pk may belong to a same packet flow (namely, they may all have a same source address and a same destination address) or to different packet flows whose paths are overlapping between the nodes 1 and 2. Similarly, the packets Pk' may belong to a same packet flow or to different packet flows whose paths are overlapping between the nodes 2 and 1.

The packets Pk, Pk' are formatted according to a certain network protocol. By way of non limiting example, the network protocol may be the above mentioned QUIC protocol.

Figure 2:
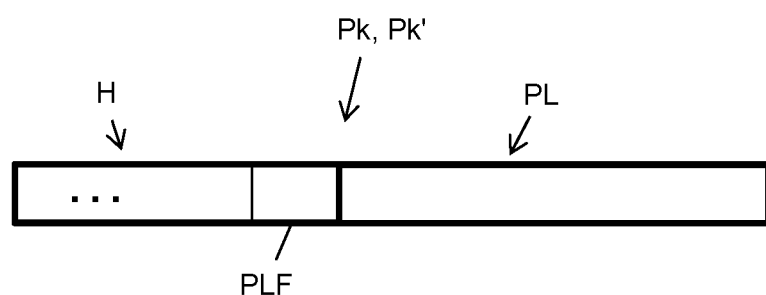
FIG. 2 schematically shows the structure of a packet exchanged in the communication network of FIG. 1, according to embodiments of the present invention.

As schematically depicted in FIG. 2, each packet Pk, Pk' comprises a payload PL and a header H. The payload PL comprises user data. The header H of each packet Pk, Pk' is formatted according to the network protocol supported by the network 100 and comprises packet forwarding information (not shown in FIG. 2), namely information allowing the nodes of the network 100 to properly handle the packets Pk, Pk' so that they reach their destination nodes.

According to embodiments of the present invention, the header H of each packet Pk, Pk' preferably also comprises a packet loss field PLF. The packet loss field PLF comprises one or more bits. The packet loss field PLF may be set to anyone of:
- an idle value (e.g. "0" in case of a one-bit packet loss field or "00" in case of a two-bit packet loss field); and
- at least one measurement value (e.g. "1" in case of a one-bit packet loss field or "01", "11" and "10" in case of a two-bit packet loss field).

Figure 3:
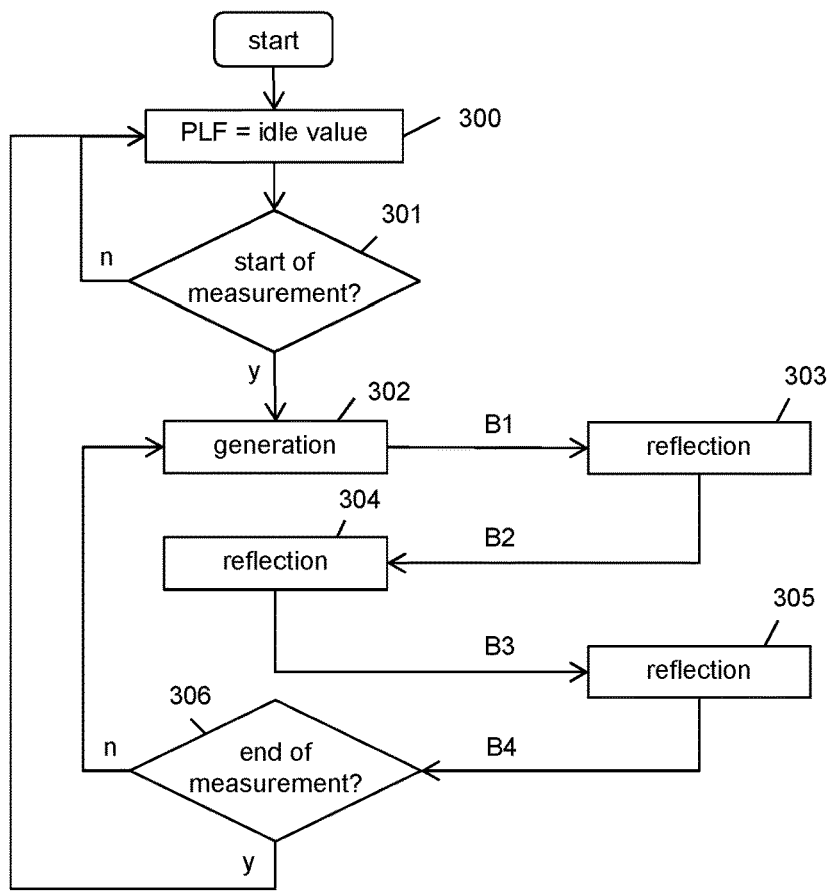
FIG. 3 is a flow chart of the operation of a first and second node of the communication network of FIG. 1, according to a first embodiment of the present invention.

With reference to the flow chart of FIG. 3, the operation of the nodes 1 and 2 will be now described in detail, according to an embodiment of the present invention.

Preferably, the node 1 normally transmits to the node 2 packets Pk having their packet loss field PLF set to the idle value (step 300).

Preferably, as the node 1 determines that a round-trip measurement shall be started (step 301), it preferably performs a generation step (step 302) which comprises switching the value applicable to the packet loss field PLF of the packets Pk to be transmitted from the idle value to the measurement value (herein after, it is assumed that a single measurement value is used by the nodes 1 and 2, e.g. "1").

Hence, at the generation step 302 the node 1 starts transmitting to the node 2 packets Pk having their packet loss field PLF set to the measurement value. The node 1 preferably continues transmitting packets Pk having their packet loss field PLF set to the measurement value until a predefined condition occurs. The predefined condition may be, for instance:
(i) the number of transmitted packets Pk having their packet loss field PLF set to the measurement value has reached a certain value Nb; or
(ii) a time Tb has expired since transmission of the first packet having its packet loss field PLF set to the measurement value.

Upon occurrence of the predefined condition, the node 1 terminates the generation step 302 by switching again the value applicable to the packet loss field PLF of the packets Pk to be transmitted from the measurement value to the idle value.

Hence, during the generation step 302 the node 1 basically transmits to the node 2 a block B1 of packets Pk having their packet loss field PLF set to the measurement value. The block B1 comprises N1 packets, where N1 is fixed and equal to Nb if the condition (i) above is applied, or variable and depending on Tb and the packet rate in the direction from node 1 to node 2 if the condition (ii) above is applied.

In any case, in this first embodiment it is assumed that the duration of the block B1 (namely, the difference between transmission times of the last packet Pk and first packet Pk of the block B1) is lower than the RTT between the nodes 1 and 2.

As the node 2 receives the block B1 of packets Pk generated during the generation step 302, it preferably reflects it back towards the node 1 (step 303). By reflecting a block of packet it is herein meant to send, in a direction opposite to the direction from which a block of packets was received, a block of packets including packets that the node needs to send towards the opposite node, but with each packet having the value of the packet loss field PLF set in functional relationship with the value of the packet loss field PLF comprised in a corresponding packet Pk that was received from the opposite node.

In particular, the node 2 preferably continuously reflects towards the node 1 the value of the packet loss field PLF comprised in the packets Pk received from the node 1. Hence, as the node 2 receives from the node 1 a packet Pk having its packet loss field PLF set to the idle value, it preferably sets to the idle value the packet loss field PLF of the next packet Pk' to be transmitted to the node 1. Similarly, as the node 2 receives from the node 1 a packet Pk having its packet loss field PLF set to the measurement value, it preferably sets to the measurement value the packet loss field PLF of the next packet Pk' to be transmitted to the node 1.

Hence, at the reflection step 303, as the node 2 receives the block B1 of packets Pk having their packet loss field PLF set to the measurement value, it basically transmits back to the node 1 a block B2 of packets Pk' having their packet loss field PLF set to the measurement value. If no packet loss occurs, the block B2 comprises the same number N2=N1 of packets Pk' as the block B1. If a packet loss occurred, instead, the number N2 of packets Pk' in the block B2 is lower than N1.

Since it has been assumed that the duration of the block B1 is lower than the RTT between the nodes 1 and 2, when the node 1 receives the first packet Pk' of the block B2 the generation step 302 is already finished.

As the node 1 receives the block B2 of packets Pk' generated during the reflection step 303, it preferably reflects it back again towards the node 2 (step 304). The operation of the node 1 during the reflection step 304 is similar to that of the node 2, namely the node 1 reflects towards the node 2 the value of the packet loss field PLF comprised in the packets Pk' received from the node 2. Hence, at the reflection step 304, as the node 1 receives the block B2 of packets Pk' having their packet loss field PLF set to the measurement value, it basically transmits back to the node 2 a block B3 of packets Pk having their packet loss field PLF set to the measurement value. If no packet loss occurs, the block B3 comprises the same number N3=N2 of packets Pk as the block B2. If a packet loss occurred, instead, the number N3 of packets Pk in the block B3 is lower than N2.

As the node 2 receives the block B3 of packets Pk generated during the reflection step 304, it preferably reflects it back again towards the node 1 (step 305). In particular, since the node 2 preferably continuously reflects towards the node 1 the value of the packet loss field PLF comprised in the packets Pk received from the node 1, at the reflection step 305, as the node 2 receives the block B3 of packets Pk having their packet loss field PLF set to the measurement value, it basically transmits back to the node 1 a block B4 of packets Pk' having their packet loss field PLF set to the measurement value. If no packet loss occurs, the block B4 comprises the same number N4=N3 of packets Pk' as the block B3. If a packet loss occurred, instead, the number N4 of packets Pk' in the block B4 is lower than N3.

Upon reception of the block B4 of packets Pk' having their packet loss field PLF set to the measurement value, the node 1 determines if the round-trip packet loss measurement shall be terminated or not (step 306).

In the affirmative, the node 1 preferably reverts to step 300, namely it continues transmitting to the node 2 packets Pk having their packet loss field PLF set to the idle value.

In the negative, the node 1 preferably reverts to the generation step 302, thereby transmitting to the node 2 a new block B1 of packets Pk having their packet loss field PLF set to the measurement value, which will then undergo the above described reflection steps 303, 304 and 305.

Hence, at each iteration of steps 301-305 which is performed between start and end of the measurement session, the nodes 1 and 2 preferably exchange four blocks B1, B2, B3, B4 of packets having their packet loss field PLF set to the measurement value. If no packet loss occurs, the blocks B1, B2, B3, B4 comprise a same number of packets.

In order to perform a round-trip packet loss measurement between the nodes 1 and 2, a measurement point 10 may be provided in an intermediate position between the nodes 1 and 2, as schematically depicted in FIG. 1. This is not limiting. The measurement point 10 may be provided either in an intermediate position between the nodes 1 and 2 or at the node 1 or 2.

Figure 4:
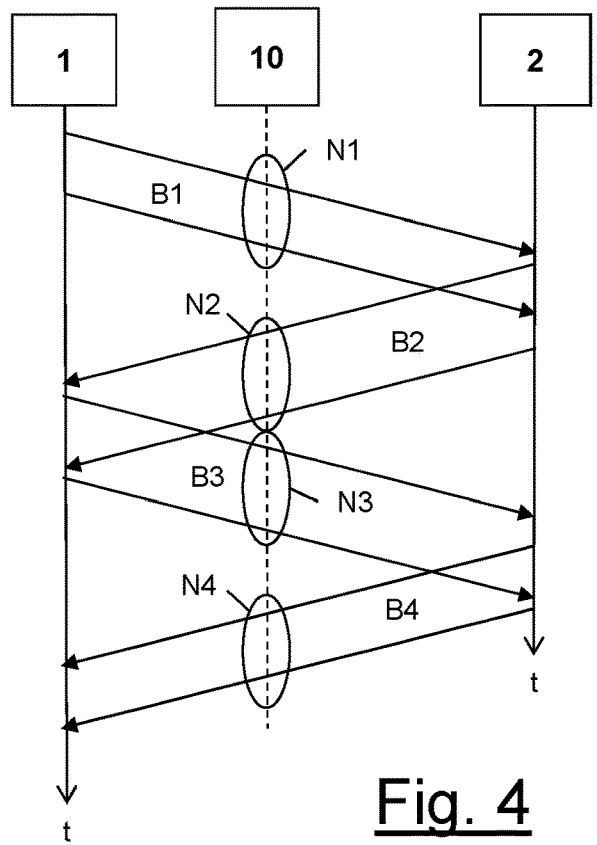
FIG. 4 schematically shows packets exchanged by the first and second node operating according to the flow chart of FIG. 3.

Assuming for example that the measurement point 10 is configured to detect packets Pk transmitted in the direction from the node 1 to the node 2, the measurement point 10 preferably counts the number N1 of packets Pk comprised in the block B1 generated by the node 1 and the number N3 of packets Pk comprised in the block B3 resulting from double reflection of the block B1, as schematically depicted in FIG. 4.

The round-trip packet loss between the nodes 1 and 2 may then be calculated as the difference N1-N3. The calculation may be repeated for each pair of blocks B1-B3, thereby providing a periodic monitoring of the round-trip packet loss.

If instead the measurement point 10 is configured to detect packets Pk' transmitted in the opposite direction from the node 2 to the node 1, the measurement point 10 preferably counts the number N2 of packets Pk' comprised in the block B2 and the number N4 of packets Pk' comprised in the block B4 generated by the node 2 resulting from double reflection of the block B2, as schematically depicted in FIG. 4.

The round-trip packet loss between the nodes 1 and 2 in this case may then be calculated as the difference N2-N4. The calculation may be repeated for each pair of blocks B2-B4, thereby providing a periodic monitoring of the round-trip packet loss.

In both cases, the obtained packet loss measurement is "round-trip" in that it does not provide any indication as to the distribution of the lost packets between the two directions.

However, since each block B3 of packets Pk is obtained by a double reflection—at the node 2 and then at the node 1—of a respective block B1 of packets Pk (and, similarly, in the opposite direction each block B4 of packets Pk' is obtained by a double reflection—at the node 1 and then at the node 2—of a respective block B2 of packets Pk'), the measurement of the round-trip packet loss is advantageously performed on a same number of packets transmitted in both directions between the nodes 1 and 2, independently of the packet rates in the two directions. Hence, as discussed above, the measurements are accurate even when the two directions exhibit different packet rates.

The Applicant has noticed that, due to very different packet rates in the two directions, the reflection at the node transmitting at the lower packet rate may take a too long time. For example, if the packet rate from the node 2 to the node 1 is 1/10 the packet rate from the node 1 to the node 2, a too long time may lapse before the node 2 transmits N2=N1 packets Pk' with their packet loss field PLF set to the measurement value. This is undesirable because, in order to monitor the round-trip packet loss, a measurement period of the order of magnitude of tens-hundreds of milliseconds is typically desired.

Furthermore, it has to be guaranteed that the measurement point 10 is capable of properly distinguishing packets Pk or Pk' transmitted in the same direction and belonging to different blocks B1, B3 or B2, B4. Otherwise, the measurement point 10 can not count in the proper way the number of packets N1, N3 or N2, N4 belonging to the two blocks and, hence, can not provide a correct value of the round-trip packet loss.

Figure 5:
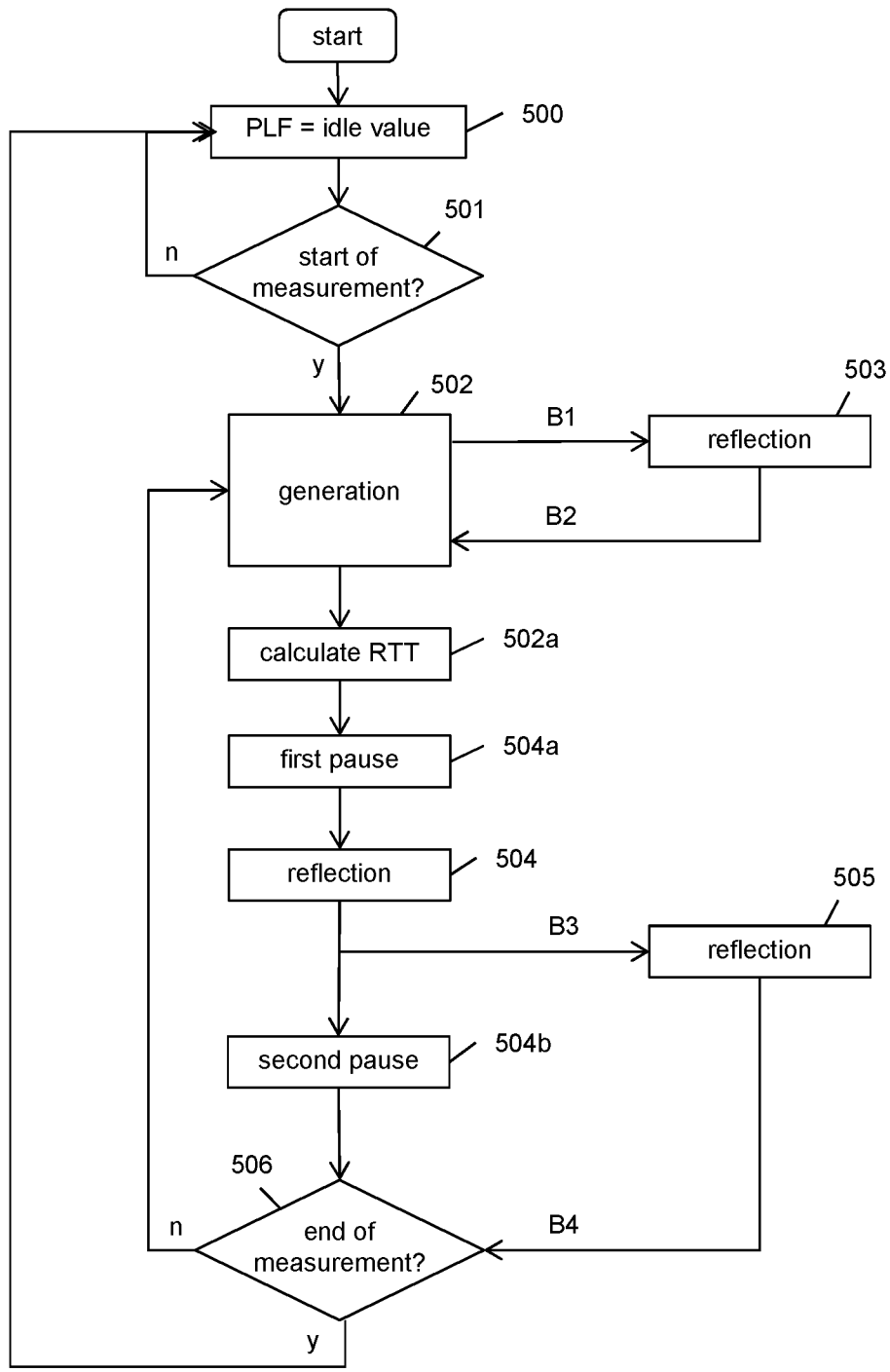
FIG. 5 is a flow chart of the operation of a first and second node of the communication network of FIG. 1, according to a second embodiment of the present invention.

FIG. 5 is a flow chart showing the operation of the nodes 1 and 2 according to another embodiment of the present invention.

According to such embodiment, the nodes 1 and 2 preferably use a single measurement value for the packet loss field PLF of the exchanged packets Pk and Pk'. Hence, the packet loss field PLF may be a one-bit field which may be set to either the idle value "0" or the measurement value "1".

Preferably, the node 1 normally transmits to the node 2 packets Pk having their packet loss field PLF set to the idle value (step 500).

Preferably, as the node 1 determines that a round-trip measurement shall be started (step 501), it performs a generation step 502 which comprises setting the packet loss field PLF of a packet Pk to be transmitted equal to the measurement value each time a packet Pk' is received from the node 2.

For instance, this may be performed by the node 1 by means of a generation counter, which the node 1 increases by 1 each time a packet Pk' is received from the node 2 (irrespective of the value of its packet loss field PLF) and decreases by 1 each time a packet Pk having its packet loss field PLF equal to the measurement value is transmitted to the node 2. As long as the generation counter is higher than 0, the node 1 preferably sets the packet loss field PLF of the packets Pk to be transmitted equal to the measurement value. When instead the generation counter is equal to 0, the node 1 preferably keeps the packet loss field PLF of the packets Pk to be transmitted equal to the idle value.

The generation step 502 then results in the node 1 transmitting to the node 2 a block B1 of packets Pk having their packet loss field PLF set to the measurement value.

According to this embodiment, the packets Pk of the block B1 may be non contiguous. If the packet rate in the direction from the node 2 to the node 1 is lower than the packet rate from node 1 to node 2, indeed, some packets Pk will be transmitted with their packet loss field PLF equal to the idle value between reception of two consecutive packets Pk' from the node 2.

As the node 2 receives the block B1 of packets Pk generated during the generation step 502, it preferably reflects it back towards the node 1 (step 503).

In particular, also according to this embodiment the node 2 preferably continuously reflects towards the node 1 the value of the packet loss field PLF comprised in the packets Pk received from the node 1. Hence, as the node 2 receives from the node 1 a packet Pk having its packet loss field PLF set to the idle value, it preferably sets to the idle value the packet loss field PLF of the next packet Pk' to be transmitted to the node 1. Similarly, as the node 2 receives from the node 1 a packet Pk having its packet loss field PLF set to the measurement value, it preferably sets to the measurement value the packet loss field PLF of the next packet Pk' to be transmitted to the node 1.

For instance, reflection at the node 2 may be performed by implementing a marked packet counter, which the node 2 increases by 1 each time a packet Pk having its packet loss field PLF equal to the measurement value is received from the node 1 and decreases by 1 each time a packet Pk' having its packet loss field PLF equal to the measurement value is transmitted to the node 1. As long as the marked packet counter is higher than 0, the node 2 preferably sets the packet loss field PLF of the packets Pk' to be transmitted equal to the measurement value. When instead the marked packet counter is equal to 0, the node 2 preferably keeps the packet loss field PLF of the packets Pk' to be transmitted equal to the idle value.

Hence, at the reflection step 503, as the node 2 receives the block B1 of packets Pk having their packet loss field PLF set to the measurement value, it basically transmits back to the node 1 a block B2 of packets Pk' having their packet loss field PLF set to the measurement value.

According to this embodiment, the node 1 preferably terminates the generation step 502 when it receives the first packet of the block B2. For terminating the generation step 502, the node 1 preferably forces the generation counter to zero.

At the end of the generation step 502, the node 1 preferably calculates a RTT as a difference between the reception time of the first packet of the block B2 and the transmission time of the first packet of the block B1 (step 502a).

Then, the node 1 preferably executes a first pause (step 504a) before starting reflection of the block B2. For executing the first pause 504a, the node 1 preferably forces the packet loss field PLF of the packets Pk to be transmitted equal to the idle value.

Further, during the first pause 504a, the node 1 also preferably initializes to 1 a reflection counter, which is then increased by 1 each time a packet Pk' of the block B2 (namely, of packets Pk' having their packet loss field PLF equal to the measurement value) is received from the node 2.

Preferably, the duration of the first pause 504a is equal to the RTT as calculated by the node 1 at step 502a.

Then, upon expiration of the first pause 504a, the node 1 preferably starts a reflection step 504, by reflecting towards the node 2 the value of the packet loss field PLF comprised in the packets Pk' received from the node 2. Preferably, at the reflection step 504 the node 1 sets the packet loss field PLF of a packet Pk to be transmitted equal to the measurement value each time a packet Pk' is received from the node 2.

In particular, as long as the value of the reflection counter initialised during the first pause 504a is higher than 0, the node 1 transmits packets Pk with their packet loss field PLF equal to the measurement value. Each time a packet Pk with packet loss field PLF equal to the measurement value is transmitted, the reflection counter is decreased by 1. The reflection step 504 ends when all the packets Pk' of the block B2 have been reflected, namely, when the reflection counter reaches the value 0.

Hence, at the reflection step 504, the node 1 basically transmits back to the node 2 a block B3 of packets Pk having their packet loss field PLF set to the measurement value.

It shall be noticed that, although in principle all the packets Pk' of the block B2 shall be received at the node 1 before expiration of the first pause 504a, some packets Pk' of the block B2 may undergo an anomalous delay and be received at the node 1 after the end of the first pause 504a. In order not to risk that such packets Pk' once reflected are confused with the packets Pk of the block B1 which will be transmitted at the next iteration of the generation step 502, after a certain time gap from the expiry of the first pause 504a the node 1 preferably starts ignoring the received packets Pk' having their packet loss field PLF equal to the measurement value. This time gap is preferably equal to half the RTT calculated by the node 1 at step 502a. Preferably, in order to ignore such late packets Pk', the node 1 preferably blocks any further increase of the reflection counter after the time gap is expired since expiry of the first pause 504a.

As the node 2 receives the block B3 of packets Pk generated during the reflection step 504, it preferably reflects it back again towards the node 1 (step 505). In particular, since the node 2 preferably continuously reflects towards the node 1 the value of the packet loss field PLF comprised in the packets Pk received from the node 1, at the reflection step 505, as the node 2 receives the block B3 of packets Pk having their packet loss field PLF set to the measurement value, it basically transmits back to the node 1 a block B4 of packets Pk' having their packet loss field PLF set to the measurement value.

The reflection step 505 may be implemented by means of a marked packet counter, as described above in connection with the reflection step 503.

While the node 2 is performing the reflection step 505, at the end of the reflection step 504 the node 1 preferably executes a second pause (step 504b) between the end of reflection of the block B2 and start of the generation of the next block B1. For executing the second pause 504b, the node 1 preferably forces again the packet loss field PLF of the packets Pk to be transmitted equal to the idle value.

Preferably, the duration of the second pause 504b is equal to the RTT as calculated by the node 1 at step 502a. Alternatively, the node 1 may calculate an updated value of RTT as a difference between the reception time of the first packet of the block B4 and the transmission time of the first packet of the block B3 and use such updated RTT for determining the duration of the second pause 504b.

Upon expiry of the second pause 504b, the node 1 determines if the round-trip packet loss measurement shall be terminated or not (step 506).

In the affirmative, the node 1 preferably reverts to step 500, namely it continues transmitting to the node 2 packets Pk having their packet loss field PLF set to the idle value.

In the negative, the node 1 preferably reverts to the generation step 502, thereby transmitting to the node 2 a new block B1 of packets Pk having their packet loss field PLF set to the measurement value, which will then undergo the above described reflection steps 503, 504 and 505.

For reasons similar to those discussed above in connection with the reflection step 504, preferably, at each iteration of the generation step 502 subsequent to the first one, the node 1 preferably starts waiting for the first generated packet only after a time gap has lapsed since the end of the preceding second pause 504b. The time gap is preferably equal to half RTT, the value RTT being either the one calculated at step 502a or the one updated before the second pause 504b.

Hence, at each iteration of steps 501-505 which is performed between start and end of the measurement session, the nodes 1 and 2 preferably exchange four blocks B1, B2, B3, B4 of packets having their packet loss field PLF set to the measurement value. If no packet loss occurs, the blocks B1, B2, B3, B4 comprise a same number of packets.

As described above, the measurement point 10 may perform a round-trip packet loss measurement between the nodes 1 and 2 on the packets Pk of the blocks B1 and B3, or on the packet Pk' of the blocks B2 and B4.

Figure 6:
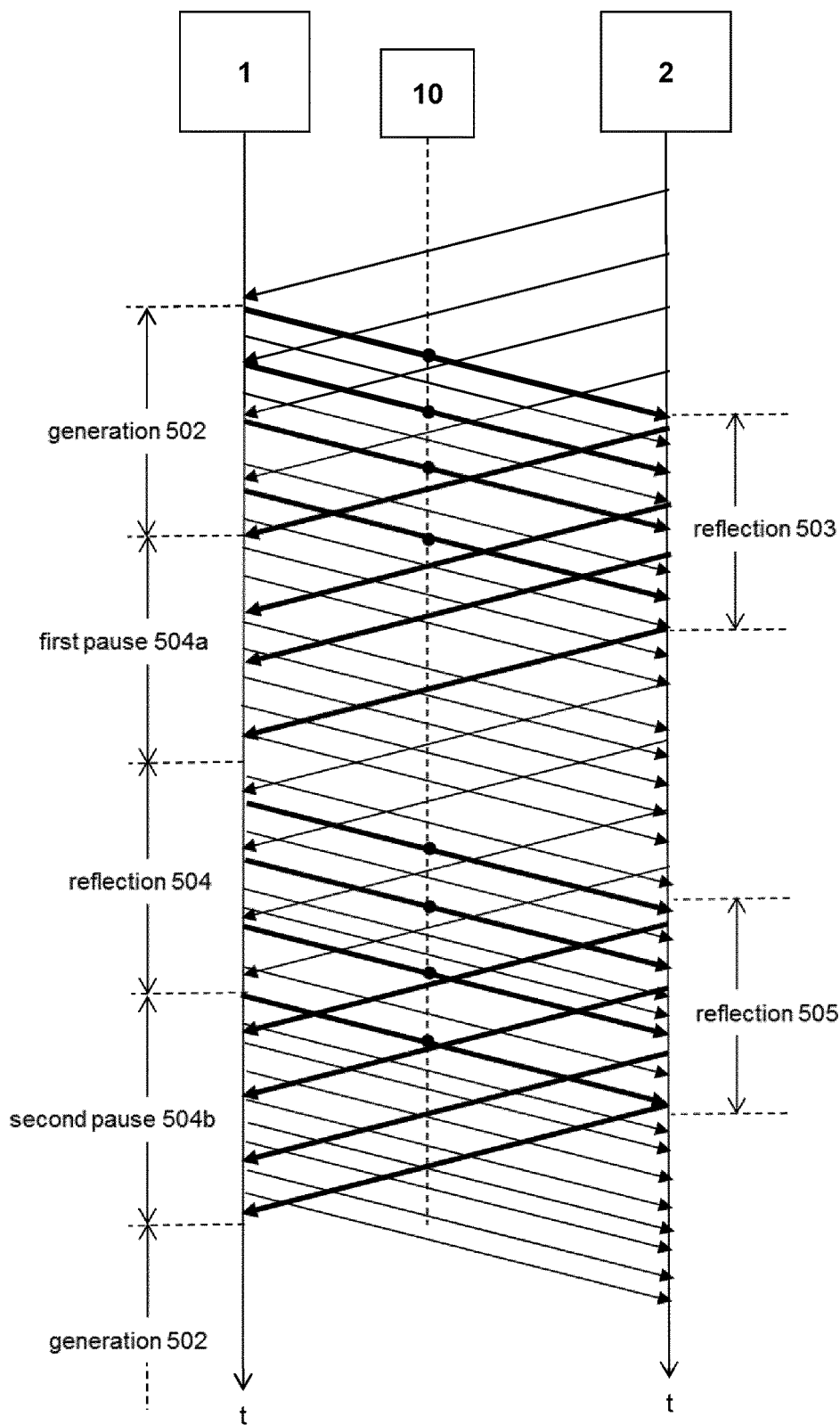
FIG. 6 schematically shows packets exchanged by the first and second node operating according to the flow chart of FIG. 5.

FIG. 6 shows an exemplary exchange of packets between two nodes 1 and 2 operating according to the flow chart of FIG. 5, under the assumption that the packet rate in the direction from node 2 to node 1 is roughly half the packet rate in the direction from node 1 to node 2.

In FIG. 6 it may be seen that during the generation step 502 a block B1 of N1=4 packets Pk is generated, each packet Pk of the block B1 being transmitted in response to reception of a respective packet Pk' from the node 2, irrespective of the value of its packet loss field PLF. In FIG. 6, packets with packet loss field PLF equal to the measurement value are represented by thick lines.

If no packet loss occurs amongst the packets Pk of the block B1, at the reflection step 503 the node 2 reflects back a block B2 of N2=4 packets Pk' to the node 1.

As the node 1 receives the first packet Pk' of the block B2, it ends the generation step 502 and enters the first pause 504a. During the first pause 504a, the packets Pk' of the block B2 are received at the node 1, which accordingly increases its reflection counter. Assuming no packet loss occurred amongst the packets Pk' of the block B2 and that all the packets Pk' of the block B2 are received at the node 1 before expiry of the first pause 504a, the reflection counter increases from 1 to 4 during the first pause 504a.

Then, upon expiry of the first pause 504a, the node 1 starts the reflection step 504 so that it reflects back to the node 2 a block B3 of N3=4 packets Pk. During the reflection step 504, the reflection counter is decreased from 4 to 0.

When the reflection counter reaches the value 0, the reflection step 504 is terminated and the node 1 enters the second pause 504b.

In the meanwhile, if no packet loss occurs amongst the packets Pk of the block B3, at the reflection step 505 the node 2 reflects back a block B4 of N4=4 packets Pk' to the node 1.

As described above in connection with the embodiment of FIG. 3, the measurement point 10 may perform a round-trip packet loss measurement by counting the number N1 of packets Pk of the block B1, the number N3 of packets Pk of the block B3 and then calculate a round-trip packet loss as the difference between N1 and N3. In the opposite direction, the measurement point 10 may perform a round-trip packet loss measurement by counting the number N2 of packets Pk' of the block B2, the number N4 of packets Pk' of the block B4 and then calculate a round-trip packet loss as the difference between N2 and N4.

More specifically, with reference for example to the direction from the node 1 to the node 2, the measurement point 10 may implement a counter counting the number of packets Pk having their packet loss field PLF equal to the measurement value. Hence, the measurement point 10 preferably increases the counter each time it detects a packet Pk with packet loss field PLF equal to the measurement value.

Preferably, when the measurement point 10 detects a first pause longer than a minimum threshold value since start of a measurement session between detection of two consecutive packets Pk having their packet loss field PLF equal to the measurement value, it preferably sets a first variable C1 equal to the difference between the current counter value and the counter value at the end of the preceding pause (or 0 if there is no preceding pause, namely at the first iteration). The minimum threshold value may be for example equal to half the RTT calculated by applying the known spin bit technique.

At the end of the pause, the measurement point 10 continues increasing the counter.

Then, upon detection of the next pause between detection of two consecutive packets Pk having their packet loss field PLF equal to the measurement value, it preferably sets a second variable C2 equal to the difference between the current counter value and the counter value at the end of the preceding pause.

Then, the measurement point 10 preferably calculates the round-trip packet loss as the difference between C1 and C2.

By alternately setting the values of C1 and C2 during the whole measurement session, the measurement point 10 basically provides a periodic monitoring of the round-trip packet loss between the nodes 1 and 2.

It may be appreciated that, since at the generation step 502 the node 1 transmits a packet Pk of the block B1 only upon reception of a packet Pk from the node 2, the number of packets Pk of the block B1 is such that the reflection steps 503, 504 can be managed by the node 2 in a reasonable time, even when the packet rate from the node 2 is much lower than the packet rate from the node 1. This allows avoiding congestions at the node 2 and providing measurement periods equal to about 4 RTT, namely of the order of magnitude of 100-200 milliseconds. It shall be noticed that the round-trip packet loss measurement is performed on about ¼ of the packets transmitted in the direction (from node 1 to node 2 or vice versa) having the lower packet rate.

Furthermore, the pauses 504a, 504b advantageously guarantee that the measurement point 10 is capable of properly distinguishing packets Pk or Pk' transmitted in the same direction and belonging to different blocks B1, B3 or B2, B4. Hence, the measurement point 10 is capable of counting in the proper way the number of packets N1, N3 or N2, N4 belonging to the two blocks and, hence, providing a correct value of the round-trip packet loss.

Further, the Applicant has estimated that, if the generation step 502 and the reflection step 504 at the node 1 are performed by ignoring the packets Pk' received from the node 2 after a time gap of RTT/2 has expired since expiry of the first and second pauses 504a, 504b, respectively, the method provides correct measurement results if the variations of the RTT between the nodes 1 and 2 does not exceed ±50% RTT within a same measurement session.

According to an advantageous variant of the first embodiment, the node 1 preferably starts the reflection step 504 after a further pause (preferably of duration equal to the RTT calculated at step 502a) has lapsed since reception of the last packet of the block B2. Similarly, the node 1 preferably reverts to a new generation step 502 after a still further pause (preferably of duration equal to the RTT calculated at step 502a) has lapsed since reception of the last packet of the block B4.

This way, the measurement periods are longer (namely, about 6 RTT) but, advantageously, the various iterations of the algorithms are well separated and the risk of overlapping due to anomalous delay of packets is advantageously minimized. Hence, the round-trip packet loss measurements are advantageously correct even in case of large variations of the RTT. It shall be noticed that in this case the round-trip packet loss measurement is performed on about ⅙ of the packets transmitted in the direction from node 1 to node 2 or vice versa having the lower packet rate.

The measurement point 10 may also be configured to provide a RTT (round-trip time) measurement between the nodes 1 and 2. For this purpose, the measurement point 10 preferably records the detection time T1 of the first packet Pk with packet loss field PLF equal to the measurement value detected after the end of a pause (namely, the first packet Pk of the block B1) and the detection time T2 of the last packet Pk with packet loss field PLF equal to the measurement value detected before start of the subsequent pause (namely, the last packet of the block B1). Then, the RTT is calculated as the difference between T2 and T1. Since at the first iteration of the RTT calculation the measurement point 10 shall detect the pauses before it has calculated the value of RTT, in order to detect the pauses the measurement point 10 may use for example the RTT calculated using the known spin bit technique, at least at the first iteration. Then, for each subsequent iteration, in order to detect the pauses the measurement point 10 may use the value of RTT calculated at the previous iteration as described above.

The Applicant has noticed that the RTT calculated in this way provides a measurement period which is, on the average, ¼ (or ⅙, according to the above described variant) the measurement period in case of RTT measurements performed according to B. Trammel et al.: Internet draft "The addition of a Spin Bit to the QUIC Transport Protocol draft-trammel-quic-spin-01", Dec. 13, 2017. The RTT measurement is indeed performed only on packets Pk of the block B1 (then there are two pauses of duration RTT and a reflection step of duration RTT, on the average).

It may also be appreciated that the RTT can not be calculated based on the detection times of packets Pk of the block B3, because the block B3 is obtained by reflection and hence the time lapsing between detection of the first and last packet by the measurement point 10 does not correspond to the RTT.

Figure 7:
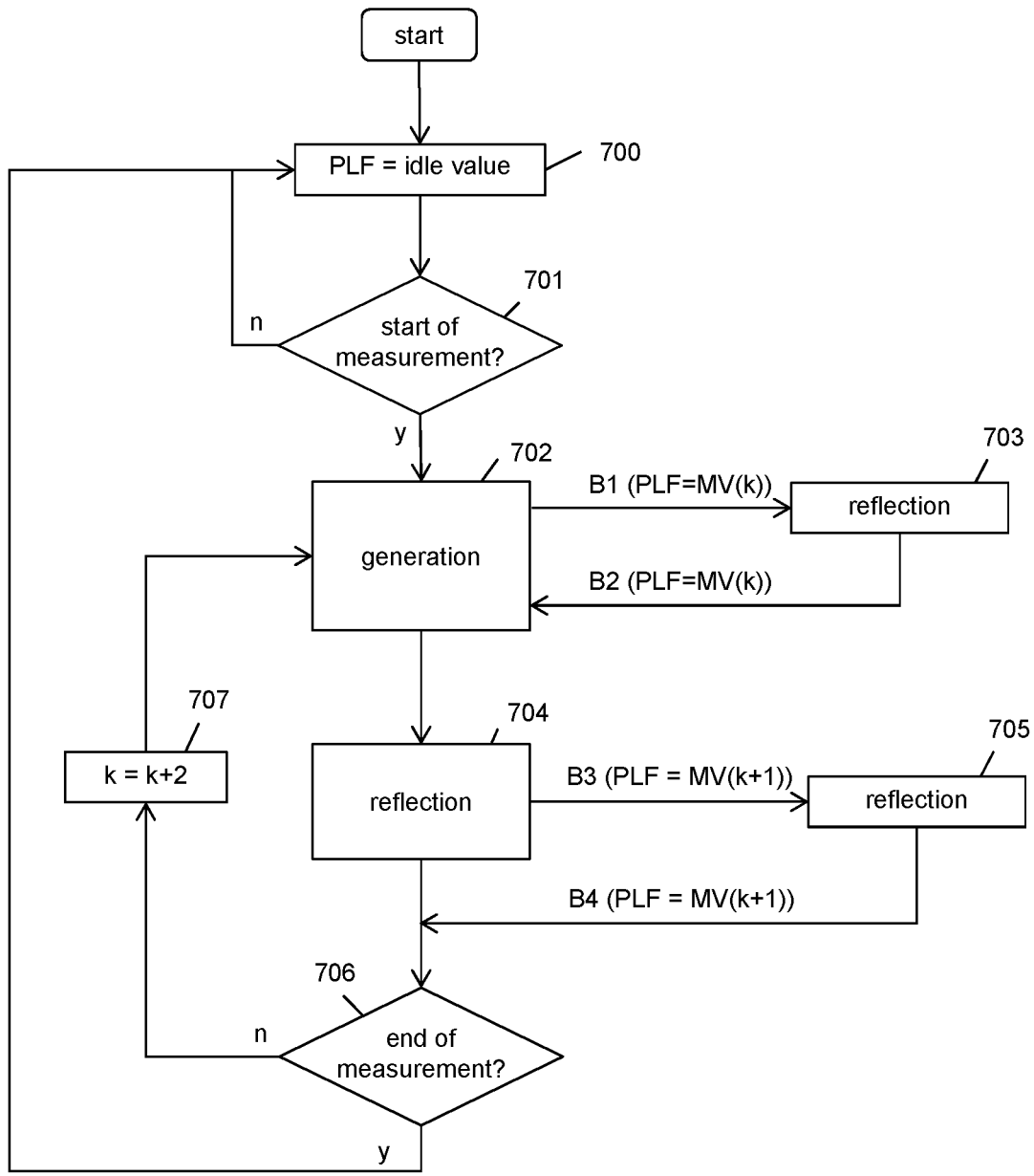
FIG. 7 is a flow chart of the operation of a first and second node of the communication network of FIG. 1, according to a third embodiment of the present invention.

FIG. 7 is a flow chart showing the operation of the nodes 1 and 2 according to still another embodiment of the present invention.

According to such embodiment, the node 1 and 2 preferably use at least two measurement values for the packet loss field PLF of the exchanged packets Pk and Pk'. Herein after, by way of non limiting example, it is assumed that the packet loss field PLF may be a two-bit field which may be set to either the idle value "00" or one of three measurement values "01", "10" and "11". Herein after, for simplicity, these three measurement values will be termed also "measurement value A", "measurement value B" and "measurement value C".

For example, a measurement values array MV(k) may be implemented at the node 1, which comprises an element for each measurement value A, B and C. The array index k ranges from 0 to the number of measurement values decreased by 1 (namely k=0, 1, 2 in the present case).

Preferably, the node 1 normally transmits to the node 2 packets Pk having their packet loss field PLF set to the idle value (step 700).

Preferably, as the node 1 determines that a round-trip measurement shall be started (step 701), it performs a generation step 702 which comprises setting the packet loss field PLF of a packet Pk to be transmitted equal to the measurement value MV(k) (k=0, 1 or 2) each time a packet Pk' is received from the node 2 whose packet loss field PLF comprises either the idle value or the measurement value MV(k−1), where "−" indicates a modulo 3 difference. At the first iteration of the generation step 702, of course, all the received packets Pk' have their packet loss field PLF equal to the idle value.

For example, the generation step 702 may be performed by the node 1 by means of a generation counter, which the node 1 increases by 1 each time a packet Pk' is received from the node 2 whose packet loss field PLF comprises either the idle value or the measurement value MV(k−1). Each time the node 1 shall transmit a packet Pk, it preferably checks whether the generation counter is higher than 0. If the generation counter is higher than 0, the node 1 preferably sets the packet loss field PLF of the packet Pk to be transmitted equal to the measurement value MV(k) and decreases the generation counter by 1. If instead the generation counter is equal to 0, the node 1 preferably sets the packet loss field PLF of the packet Pk to be transmitted equal to the idle value.

According to a particularly advantageous variant, at the generation step 702 also a reflection counter is used in addition to the generation counter. The node 1 preferably increases the reflection counter by 1 each time a packet Pk' is received from the node 2 whose packet loss field PLF comprises the measurement value MV(k−2). Each time the node 1 shall transmit a packet Pk, it preferably checks first whether the reflection counter is higher than 0. In the affirmative, the node 1 preferably sets the packet loss field PLF of the packet Pk to be transmitted equal to the measurement value MV(k−1) and decreases the reflection counter by 1, thereby performing a late reflection of the measurement value MV(k−2). In the negative (reflection counter equal to 0), the node 1 preferably checks the generation counter. If the generation counter is higher than 0, the node 1 preferably sets the packet loss field PLF of the packet Pk to be transmitted equal to the measurement value MV(k) and decreases the generation counter by 1. If instead also the generation counter is equal to 0, the node 1 preferably sets the packet loss field PLF of the packet Pk to be transmitted equal to the idle value.

In both cases (without or with late reflection of the measurement value MV(k−2)), the generation step 702 results in the node 1 transmitting to the node 2 a block B1 of packets Pk having their packet loss field PLF set to the measurement value MV(k). Also according to this embodiment, the packets Pk of the block B1 may be non contiguous. If the packet rate in the direction from the node 2 to the node 1 is lower than the packet rate from node 1 to node 2, indeed, some packets Pk will be transmitted from node 1 with their packet loss field PLF equal to the idle value between reception of two consecutive packets Pk' from the node 2.

As the node 2 receives the block B1 of packets Pk with packet loss field PLF equal to the measurement value MV(k) generated during the generation step 702, it preferably reflects it back towards the node 1 (step 703).

In particular, also according to this embodiment the node 2 preferably continuously reflects towards the node 1 the value of the packet loss field PLF comprised in the packets Pk received from the node 1. Hence, as the node 2 receives from the node 1 a packet Pk having its packet loss field PLF set to the idle value, it preferably sets to the idle value the packet loss field PLF of the next packet Pk' to be transmitted to the node 1. Similarly, as the node 2 receives from the node 1 a packet Pk having its packet loss field PLF set to the measurement value MV(k), it preferably sets to the measurement value MV(k) the packet loss field PLF of the next packet Pk' to be transmitted to the node 1.

For instance, reflection at the node 2 may be performed by implementing a FIFO queue, in which the node 2 inserts an element of value MV(k) each time a packet Pk with packet loss field PLF equal to the measurement value MV(k) is received. As in the previous embodiment, the FIFO queue is emptied as the packets Pk' with packet loss field PLF equal to the measurement value MV(k) are transmitted. As long as the FIFO queue contains elements, the node 2 preferably sets the packet loss field PLF of the packets Pk' to be transmitted equal to the measurement value MV(k). When instead the FIFO queue is completely empty, the node 2 preferably keeps the packet loss field PLF of the packets Pk' to be transmitted equal to the idle value.

Hence, at the reflection step 703, as the node 2 receives the block B1 of packets Pk having their packet loss field PLF set to the measurement value MV(k), it basically transmits back to the node 1 a block B2 of packets Pk' having their packet loss field PLF set to the same measurement value MV(k).

According to this embodiment, the node 1 preferably terminates the generation step 702 of packets Pk' with measurement value MV(k) when it receives the first packet of the block B2. For terminating the generation step 702, the node 1 preferably forces the generation counter to zero. If the reflection counter is also present, the node 1 also sets it to the value 1.

Then, upon termination of the generation step 702, the node 1 preferably starts a reflection step 704, which comprises transmitting a packet Pk with packet loss field PLF comprising the measurement value MV(k+1) (where "+" indicates a modulo 3 sum) each time a packet Pk' with packet loss field PLF comprising the measurement value MV(k) is received from the node 2.

For example, the reflection step 704 may be performed by means of a reflection counter (which preferably is the same reflection counter used for late reflection of the measurement value MV(k−2) at the generation step 702, if present), which the node 1 increases by 1 each time a packet Pk' with packet loss field PLF equal to the measurement value MV(k) is received. When the node 1 has to transmit a packet Pk, it preferably checks whether the counter value is higher than 0. In the affirmative, the node 1 preferably sets the packet loss field PLF of the packet Pk to be transmitted equal to the measurement value MV(k+1) and decreases the reflection counter by 1. If instead the reflection counter is equal to 0, the node 1 preferably sets the packet loss field PLF of the packet Pk to be transmitted equal to the idle value.

The reflection step 704 ends when all the packets Pk' of the block B2 have been reflected, namely, when the reflection counter reaches the value 0. Hence, at the reflection step 704, the node 1 basically transmits back to the node 2 a block B3 of packets Pk having their packet loss field PLF set to the measurement value MV(k+1).

As the node 2 receives the block B3 of packets Pk generated during the reflection step 704, it preferably reflects it back again towards the node 1 (step 705). In particular, since the node 2 preferably continuously reflects towards the node 1 the value of the packet loss field PLF comprised in the packets Pk received from the node 1, at the reflection step 705, as the node 2 receives the block B3 of packets Pk having their packet loss field PLF set to the measurement value MV(k+1), it basically transmits back to the node 1 a block B4 of packets Pk' having their packet loss field PLF set to the measurement value MV(k+1).

The reflection step 705 may be implemented by means of the FIFO queue described above in connection with the reflection step 703.

At the end of the reflection step 704, the node 1 determines if the round-trip packet loss measurement shall be terminated or not (step 706).

In the affirmative, the node 1 preferably reverts to step 700, namely it continues transmitting to the node 2 packets Pk having their packet loss field PLF set to the idle value.

In the negative, the node 1 preferably sets k=k+2 (step 707), "+" being a modulo 3 sum, and reverts to the generation step 702, thereby transmitting to the node 2 a new block B1 of packets Pk having their packet loss field PLF set to the measurement value MV(k+2), which will then undergo the above described reflection steps 703, 704 and 705.

Hence, use of three measurement values MV(0)=A, MV(1)=B and MV(2)=C results in a cyclic behaviour of the node 1. Indeed:
- at the i-th iteration of the generation step 702 with i=1, 4, 7, 10, etc. the node 1 generates a block B1 of packets Pk with packet loss field PLF comprising the measurement value A and reflects a received block B2 of packets Pk' with packet loss field PLF comprising the measurement value A into a block B3 of packets Pk with packet loss field PLF comprising the measurement value B;
- at the i-th iteration of the generation step 702 with i=2, 5, 8, 11, etc. the node 1 generates a block B1 of packets Pk with packet loss field PLF comprising the measurement value C and reflects a received block B2 of packets Pk' with packet loss field PLF comprising the measurement value C into a block B3 of packets Pk with packet loss field PLF comprising the measurement value A; and
- at the i-th iteration of the generation step 702 with i=3, 6, 9, 12, etc. the node 1 generates a block B1 of packets Pk with packet loss field PLF comprising the measurement value B and reflects a received block B2 of packets Pk' with packet loss field PLF comprising the measurement value B into a block B3 of packets Pk with packet loss field PLF comprising the measurement value C.

It may be appreciated that, at each iteration, the packets Pk of the block B1 and the packets Pk of the block B3 have different measurement values, namely MV(k) and MV(k+1). Similarly, at each iteration, the packets Pk' of the block B2 and the packets Pk' of the block B4 have different measurement values, namely MV(k) and MV(k+1). This advantageously allows the measurement point 10 to properly distinguish packets Pk belonging to block B1 from packets Pk belonging to block B3 (and, similarly, packets Pk' belonging to block B2 from packets Pk' belonging to block B4)—and hence to properly count them—without the need of introducing any pause between generation and reflection at the node 1.

This advantageously allows increasing the amount of monitored traffic. The Applicant has estimated that this embodiment allows monitoring ½ of the average of the packets Pk or Pk' transmitted in the direction with lower packet rate.

Hence, at each iteration of steps 701-707 which is performed between start and end of the measurement session, the nodes 1 and 2 preferably exchange four blocks B1, B2, B3, B4 of packets having their packet loss field PLF set to the measurement value MV(k) (B1 and B2) or MV(k+1) (B3 and B4). If no packet loss occurs, the blocks B1, B2, B3, B4 comprise a same number of packets.

As described above, the measurement point 10 may perform a round-trip packet loss measurement between the nodes 1 and 2 on the packets Pk of the blocks B1 and B3, or on the packet Pk' of the blocks B2 and B4.

Figure 8:
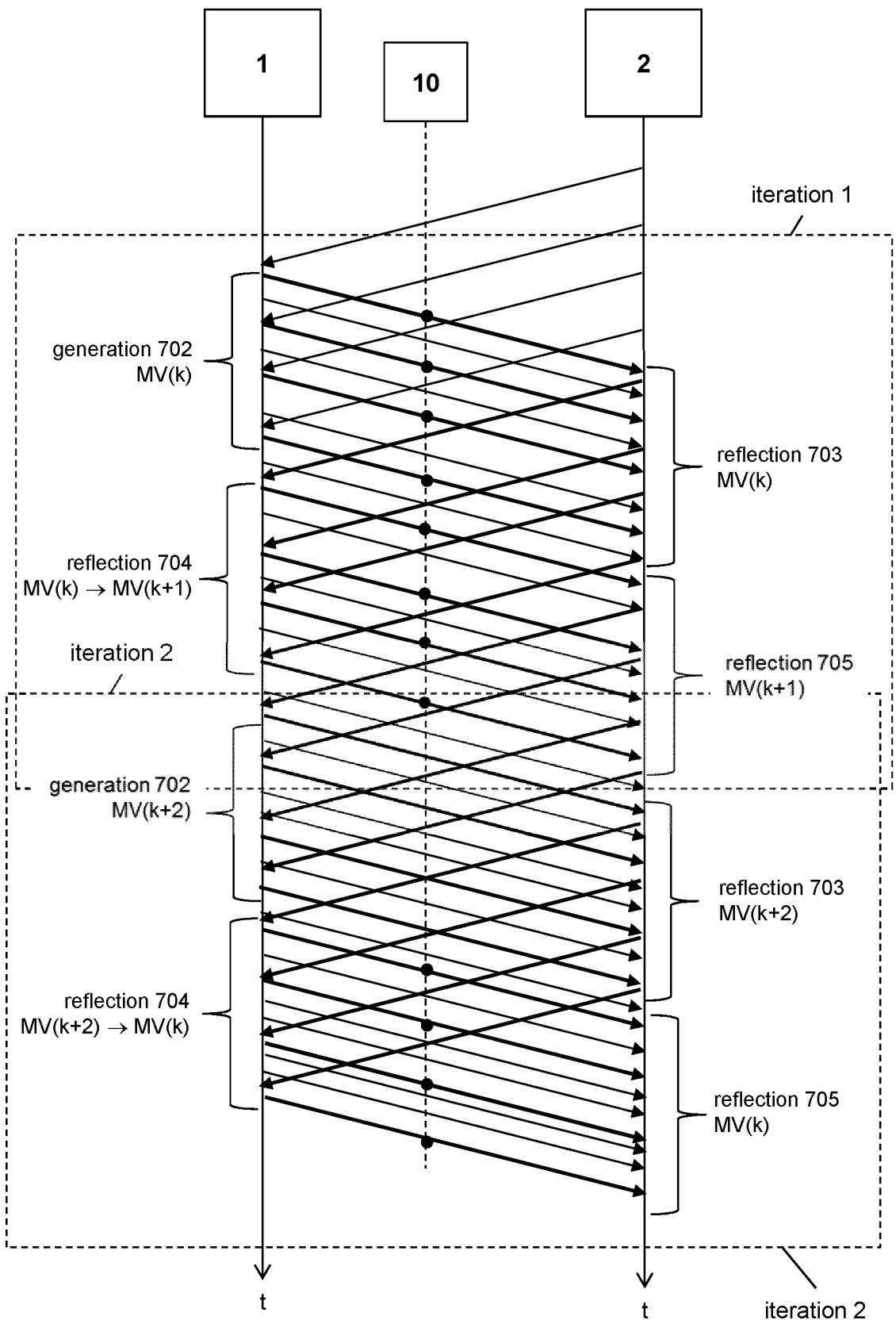
FIG. 8 schematically shows packets exchanged by the first and second node operating according to the flow chart of FIG. 7.

FIG. 8 shows an exemplary exchange of packets between two nodes 1 and 2 operating according to the flow chart of FIG. 7, under the assumption that the packet rate in the direction from node 2 to node 1 is roughly half the packet rate in the direction from node 1 to node 2. In FIG. 8, packets Pk and Pk' whose packet loss field PLF is equal to any marking value MV(k) (k=0 1, 2) are represented by thick lines.

In FIG. 8 it may be seen that during a first iteration of the generation step 702 a block B1 of N1=4 packets Pk with packet loss field PLF equal to the measurement value MV(k) is generated, each packet Pk of the block B1 being transmitted in response to reception of a respective packet Pk' from the node 2 whose packet loss field PLF is equal to the idle value.

If no packet loss occurs amongst the packets Pk of the block B1, at the reflection step 703 the node 2 reflects back a block B2 of N2=4 packets Pk' with packet loss field PLF equal to the measurement value MV(k).

As the node 1 receives the first packet Pk' of the block B2, it ends the generation step 702 and starts the reflection step 704, so that it reflects back to the node 2 a block B3 of N3=4 packets Pk with packet loss field PLF equal to the measurement value MV(k+1).

Then, if no packet loss occurs amongst the packets Pk of the block B3, at the reflection step 705 the node 2 reflects back a block B4 of N4=4 packets Pk' with packet loss field PLF equal to the measurement value MV(k+1) to the node 1.

At the subsequent iteration of the generation step 702, a block B1 of N1=4 packets Pk with packet loss field PLF equal to the measurement value MV(k+2) is generated, each packet Pk of the block B1 being transmitted in response to reception of a respective packet Pk' from the node 2 whose packet loss field PLF is equal to either the idle value or the measurement value MV(k+1).

If no packet loss occurs amongst the packets Pk of the block B1, at the reflection step 703 the node 2 reflects back a block B2 of N2=4 packets Pk' with packet loss field PLF equal to the measurement value MV(k+2).

As the node 1 receives the first packet Pk' of the block B2, it ends the generation step 702 and starts the reflection step 704, so that it reflects back to the node 2 a block B3 of N3=4 packets Pk with packet loss field PLF equal to the measurement value MV(k).

Then, if no packet loss occurs amongst the packets Pk of the block B3, at the reflection step 705 the node 2 reflects back a block B4 of N4=4 packets Pk' with packet loss field PLF equal to the measurement value MV(k) to the node 1. And so on.

As described above in connection with the embodiment of FIG. 3, the measurement point 10 may perform a round-trip packet loss measurement by counting the number N1 of packets Pk of the block B1, the number N3 of packets Pk of the block B3 and then calculating a round-trip packet loss as the difference between N1 and N3. In the opposite direction, the measurement point 10 may perform a round-trip packet loss measurement by counting the number N2 of packets Pk' of the block B2, the number N4 of packets Pk' of the block B4 and then calculating a round-trip packet loss as the difference between N2 and N4.

More specifically, with reference for example to the direction from the node 1 to the node 2, the measurement point 10 may implement 3 counters C(k) with k=0, 1, 2 (namely, one for each measurement value MV(k) with k=0, 1, 2), each one counting the number of packets Pk having their packet loss field PLF equal to a respective measurement value. Hence, the measurement point 10 preferably increases the counter C(k) each time it detects a packet Pk with packet loss field PLF equal to the measurement value MV(k).

Preferably, when the measurement point 10 detects the first packet Pk whose packet loss field PLF comprises a measurement value MV(k), it preferably reads the current value of the counter C(k−2). This way, the risk that the value of the counter C(k−2) is not fixed at the time each counter is read is advantageously minimized.

Then, the measurement point 10 may calculate a round-trip packet loss as a difference between the last read value of the counter C(k) and the last read value of the counter C(k+1).

It may be appreciated that, since at the generation step 702 the node 1 transmits a packet Pk of the block B1 only upon reception of a packet Pk from the node 2, also according to this second embodiment the number of packets Pk of the block B1 is such that the reflection steps 703, 704 can be managed by the node 2 in a reasonable time, even when the packet rate from the node 2 is much lower than the packet rate from the node 1. This allows avoiding congestions at the node 2 and providing measurement periods equal to about 2 RTT, namely of the order of magnitude of 50-100 milliseconds.

In all the embodiments described above, the node 1 performs a single reflection step 304, 504, 704 after each generation step 302, 502, 702. This is however not limiting. According to other embodiments, the node 1 may perform N reflections after each generation step, with N higher than 1. The value of N may be either fixed (e.g. N=3) or variable.

N may be varied, for instance, if the number of packets Pk with packet loss field PLF equal to a marking value decreases under a certain threshold (e.g. 70%) and/or if the reception sequence errors accumulate and make it difficult to distinguish different periods.

Use of several consecutive reflections at the node 1 advantageously increases the number of round-trip packet loss measurements. Indeed, if a single reflection provide X measurements in a certain session, using consecutive reflections for the whole session would provide up to 2*X−1 measurements.

Multiple reflections at the node 1 may be implemented in several ways. For example, the packet loss field PLF may be a two-bit field which is set to a first measurement value 1 when the measurement starts and alternatively to the measurement values 2 and 3 upon reflections. If instead the packet loss field PLF is a single bit field, a shorter pause is preferably executed by the node 1 for separating consecutive reflections while a longer pause is preferably executed to separate different iterations.

The invention claimed is:

1. A method for enabling a round-trip packet loss measurement in a packet-switched communication network, said method comprising:

exchanging between a first node and a second node of said communication network packets comprising a packet loss field, wherein said packet loss field is settable to an idle value indicating that the round-trip packet loss measurement is idle and said packet loss field is settable to at least one measurement value that enables performance of the round-trip packet loss measurement, said exchanging including:
a) by said first node, transmitting to said second node a block of first packets, each first packet of the block of first packets having said packet loss field set to a same value of said at least one measurement value;
b) by said second node, upon reception from said first node of each one of the block of the first packets, transmitting to said first node a respective second packet having said packet loss field set to said at least one measurement value such that a block of the second packets are transmitted to said first node each having a same value of said at least one measurement value; and
c) by said first node, upon reception from said second node of each one of the block of the second packets, transmitting to said second node a respective third packet having said packet loss field set to said at least one measurement value such that a block of the third packets are transmitted to said second node each having a same value of said at least one measurement value.

2. The method according to claim 1, wherein step a) comprises setting said packet loss field of a packet to be transmitted to said second node equal to said at least one measurement value in response to reception of a packet from said second node.

3. The method according to claim 1, wherein step a) is terminated when said first node receives the first one of said second packets from said second node.

4. The method according to claim 1, wherein
said idle value is a zero value, and
said at least one measurement value is a nonzero value.

5. The method according to claim 4, wherein
said first node executes at least one of:
a first pause at the end of said step a) before starting said step c); and
a second pause at the end of said step c) before repeating said step a), and
said first pause and said second pause include forcing to said idle value said packet loss field of each packet to be transmitted to said second node.

6. The method according to claim 5, wherein at least one of said step a) and said step c) comprises ignoring packets received at said first node from said second node after a time gap has lapsed since the beginning of said step a) and said step c), respectively.

7. The method according to claim 5, wherein
said first node executes at least one of:
a further pause since reception of the last one of said second packets from said second node, before starting step c); and
a still further pause since reception of the last one of a block of fourth packets having said packet loss field set to said at least one measurement value and transmitted by said second node upon reception of said third packets, before repeating step a), and
said further pause and said still further pause include forcing to said idle value said packet loss field of each packet to be transmitted to said second node.

8. The method according to claim 1, wherein
said idle value is a zero value, and
said at least one measurement value includes at least two different and ordered measurement values.

9. The method according to claim 8, wherein:
step a) comprises setting said packet loss field of a packet to be transmitted to said second node equal to a measurement value MV(k) when a packet is received from said second node whose packet loss field is equal to either said idle value or to a preceding measurement value MV(k−1);
step b) comprises, upon reception from said first node of each one of the block of first packets having said packet loss field equal to said measurement value MV(k), transmitting to said first node the respective second packet having said packet loss field set to said measurement value MV(k); and
step c) comprises, upon reception from said second node of each one of the block of second packets having said packet loss field equal to said measurement value MV(k), transmitting to said second node the respective third packet having said packet loss field set to a subsequent measurement value MV(k+1).

10. A method for performing a round-trip packet loss measurement in a packet-switched communication network, said method comprising:
the method according to claim 1, and
at a measurement point, counting a number of said first packets and counting a number of said third packets,
wherein said round-trip packet loss measurement is based on said number of said first packets and said number of said third packets.

11. The method according to claim 10, further comprising providing a round-trip time measurement between said first node and said second node as a difference between detection times of the first detected one of said first packets and the last detected one of said first packets.

12. The method according to claim 1, wherein at least one of said step a) and said step c) comprises ignoring packets received at said first node from said second node after a time gap has lapsed since the beginning of said step a) and said step c), respectively.

13. A method for exchanging packets between a first node and a second node of a packet-switched communication network, said packets comprising a packet loss field settable to an idle value indicating that a packet loss measurement is idle and settable to at least one measurement value that enables performance of the packet loss measurement, said method comprising:
by said first node, transmitting to said second node a block of first packets, each first packet of the block of first packets having said packet loss field set to a same value of said at least one measurement value;
by said second node, upon reception from said first node of each one of the block of the first packets, transmitting to said first node a respective second packet having said packet loss field set to said at least one measurement value such that a block of the second packets are transmitted to said first node each having a same value of said at least one measurement value; and
by said first node, upon reception from said second node of each one of the block of the second packets, transmitting to said second node a respective third packet having said packet loss field set to said at least one measurement value such that a block of the third packets are transmitted to said second node each having a same value of said at least one measurement value.

14. A packet-switched communication network comprising:
- a first node and a second node configured to exchange packets comprising a packet loss field, wherein
- said packet loss field is settable an idle value indicating that a round-trip packet loss measurement is idle and is settable to at least one measurement value that enables performance of the packet loss measurement;
- said first node is configured to transmit to said second node a block of first packets, each first packet of the block of first packets having said packet loss field set to a same value of said at least one measurement value;
- said second node is configured to, upon reception from said first node of each one of the block of the first packets, transmit to said first node a respective second packet having said packet loss field set to said at least one measurement value such that a block of the second packets are transmitted to said first node each having a same value of said at least one measurement value; and
- said first node is further configured to, upon reception from said second node of each one of the block of the second packets, transmit to said second node a respective third packet having said packet loss field set to said at least one measurement value such that a block of the third packets are transmitted to said second node each having a same value of said at least one measurement value.

15. The packet-switched communication network of claim 14, further comprising at least one measurement point configured to count a number of said first packets and count a number of said third packets,
- wherein the round-trip packet loss measurement is based on said number of said first packets and said number of said third packets.

* * * * *